United States Patent Office 3,100,233
Patented Aug. 6, 1963

3,100,233
PURIFICATION OF ACETYLENE TETRACHLORIDE CONTAINING CHLORINE IMPURITY
David S. Rosenberg, Niagara Falls, N.Y., assignor to Hooker Chemical Corporation, Niagara Falls, N.Y., a corporation of New York
No Drawing. Filed Oct. 5, 1960, Ser. No. 60,565
15 Claims. (Cl. 260—654)

This invention relates to the preparation of halogenated hydrocarbons. More particularly, this invention relates to the preparation of pure trichloroethylene and pure hydrogen chloride.

Trichloroethylene is usually prepared from acetylene tetrachloride made by chlorinating acetylene in the presence of ferric chloride catalyst. After suitable purification, the acetylene tetrachloride can then be converted to trichloroethylene and hydrogen chloride by thermal vapor-phase dehydrochlorination or to trichloroethylene by alkaline liquid-phase dehydrochlorination. The crude acetylene tetrachloride prepared by chlorinating acetylene contains significant proportions of various contaminants such as iron, iron chloride, chlorine and hydrogen chloride. Unless the proportion of these impurities in the crude acetylene tetrachloride is markedly reduced or eliminated prior to the dehydrochlorination step, several serious problems are created. These problems are of particular importance for thermal dehydrochlorination processes. For example, the crude acidic acetylene tetrachloride is subject to decomposition in the vaporizer, producing undesirable by-products. The impurities cause serious corrosion and fouling of the vaporizer. In addition, these various impurities are carried through the dehydrochlorination step and contaminate both the hydrogen chloride and trichloroethylene product. Finally, if dehydrochlorination is effected with a solid surface-active catalyst, iron compounds such as ferric chloride in the acetylene tetrachloride markedly impair the efficiency of the catalyst used.

Numerous techniques have been employed for removing the aforesaid impurities from acetylene tetrachloride prior to the catalytic cracking step. In one process the crude acetylene tetrachloride is vigorously agitated in the presence of water. The non-aqueous phase is then separated, dried and subjected to distillation. This technique is effective in removing impurities such as iron chloride and hydrogen chloride, but has little effect upon reducing the concentration of chlorine in the acetylene tetrachloride. In another process, the crude acetylene tetrachloride is washed first with water and then with an aqueous alkaline solution such as sodium carbonate to extract the chlorine and other impurities. The organic phase is then washed again with water and subjected to the catalytic cracking step. Although this technique is effective in reducing the iron and chlorine impurities in the acetylene tetrachloride, by-products such as sodium hypochlorite are formed which are highly corrosive to the equipment normally employed in the preparation of trichloroethylene. In addition, a disposal problem is created because of the corrosive nature of the aqueous wash solution containing these by-products.

It is an object of this invention to provide an improved process for preparing trichloroethylene and hydrogen chloride from acetylene and chlorine.

Another object of the invention is to provide an improved method of purifying impure acetylene tetrachloride.

It is a further object of the invention to provide a method for removing chlorine-containing impurities from impure acetylene tetrachloride.

Still another object of the invention is to provide a method of preparing trichloroethylene in which the normal waste by-products can be utilized advantageously in the process.

It is another object of the invention to provide a method for reducing the disposal problem normally encountered in the preparation of trichloroethylene.

These and other objects of the invention will be apparent from the following detailed description of the novel process.

It has now been discovered that impure acetylene tetrachloride can be freed from a significant proportion of its chlorine, ferric chloride and hydrogen chloride impurities by admixing the impure acetylene tetrachloride with a small proportion of unsaturated chlorinated hydrocarbon selected from the group consisting of trichloroethylene, dichloroethylene, the low boiling fraction produced in the distillation of impure trichloroethylene, and mixtures thereof, whereby substantially all of the chlorine reacts with the unsaturated chlorinated hydrocarbons to yield saturated chlorinated hydrocarbons, such as acetylene tetrachloride and pentachloroethane, and then washing the reaction mixture with water to remove substantially all of the ferric chloride and hydrogen chloride impurities.

In the instant novel process, the starting material is impure acetylene tetrachloride, which is normally prepared by chlorinating acetylene in the presence of a catalytic proportion of ferric chloride, and which normally contains between about 0.1 and about 0.4 percent excess chlorine and similar proportions of ferric chloride and hydrogen chloride. The crude acetylene tetrachloride, which is normally removed from the chlorinator at a temperature in the range between about seventy and about eighty degrees centigrade is admixed with a small proportion of an unsaturated chlorinated hydrocarbon. Suitable unsaturated chlorinated hydrocarbons include trichloroethylene, dichloroethylene, the low boiling dichloroethylene-containing fractions produced in the distillation of trichloroethylene yielded in the catalytic cracking process, and mixtures thereof. Trichloroethylene produced by dehydrochlorination of acetylene tetrachloride normally contains significant proportions of other chlorinated hydrocarbon impurities, and as a result, the trichloroethylene must be fractionally distilled to remove these impurities before it is suitable for commercial use. In this distillation step, the low boiling fraction, i.e., the fraction that boils below a temperature equivalent to about eighty-five degrees centigrade at atmospheric pressure usually contains from ten to twenty-five percent by weight of dichloroethylene and other chlorinated hydrocarbons. However, the proportion of dichloroethylene in this fraction may be seventy-five percent by weight or higher. Prior to the instant invention, this low boiling fraction was usually discarded as waste. It has now been discovered that when this stream of the low boiling components from the trichloroethylene distillation step is admixed with the impure acetylene tetrachloride, chlorine in the acetylene tetrachloride reacts with the dichloroethylene to yield acetylene tetrachloride, which is ultimately converted to trichloroethylene. Employing the low boiling fractions of the trichloroethylene distillation step in this manner has significant advantages. Firstly, chlorine in the impure acetylene tetrachloride is removed without yielding corrosive by-products. Secondly, the overall yield of trichloroethylene is improved. Thirdly, the problem of disposing of the low boiling fraction from the trichloroethylene distillation step is virtually eliminated. Pure dichloroethylene and trichloroethylene can also be employed to reduce the chlorine in the impure acetylene tetrachloride, but additional advantages are obtained when the low boiling fraction from the trichloroethylene distillation step is employed for this purpose.

The proportions of the chlorinated hydrocarbon necessary to markedly reduce or eliminate the chlorine from the impure acetylene tetrachloride will depend upon the concentration of chlorine. Generally, chlorinated hydrocarbons in a proportion between about 0.1 and about 5.0 percent by weight and preferably between about 0.5 and 2.0 percent by weight of the impure acetylene tetrachloride is employed. However, greater or lesser proportions may be employed if desired.

Mixing of the impure acetylene tetrachloride with the chlorinated hydrocarbons may be effected in any conventional mixing apparatus, for example, in a mixing tank provided with a motor-driven agitator. However, on a commercial scale adequate mixing can be effected by introducing the chlorinated hydrocarbon into the inlet side of a pump, such as a centrifugal pump, used to convey the impure acetylene tetrachloride from the chlorinator to storage. The effectiveness of the chlorinated hydrocarbon in reducing the content of chlorine containing impurities appears to decrease as the temperature decreases. Therefore, it is preferred to mix the impure acetylene tetrachloride with the chlorinated hydrocarbon as soon as possible after being discharged from the chlorinator, at which time the impure acetylene tetrachloride is generally at a temperature between about seventy and about eighty degrees centigrade. However, satisfactory results can be obtained when the impure acetylene tetrachloride is at room temperature when admixed with the chlorinated hydrocarbon, so long as the resulting mixture is aged for a sufficient length of time to permit substantially complete reaction. An aging period of about fifteen hours may be necessary at room temperature in order to obtain an effective reduction in the concentration of chlorine containing impurities.

After removal of excess chlorine from impure acetylene tetrachloride in this manner, the acetylene tetrachloride is then admixed with water to remove other impurities such as dissolved and suspended ferric chloride and dissolved hydrogen chloride. The ratio of water to acetylene tetrachloride is preferably between about 1:3 and about 1:5, but greater or lesser ratios may be employed if desired. Mixing of the acetylene tetrachloride in water can be effected in conventional mixing tanks or if desired, the water may be introduced into the inlet side of a pump, such as a centrifugal pump, which conveys the acetylene tetrachloride to a settling tank. The aqueous phase, which contains dissolved ferric chloride and hydrogen chloride impurities is removed from the settling tank and discarded. The wet purified acetylene tetrachloride removed from the settling tank is then suitable for feed to the dehydrochlorination process. For feed to an alkaline dehydrochlorination process, no additional treatment is needed. For feed to a thermal cracking process, distillation of the acetylene tetrachloride to remove water or other impurities, such as high-boiling organic compounds, may be needed. The crude trichloroethylene produced in the dehydrochlorination step is then subjected to distillation to remove chlorinated hydrocarbon impurities, such as dichloroethylene. The low boiling fraction, i.e., the fraction that boils below a temperature equivalent to about eighty-five degrees centigrade at atmospheric pressure, in the trichloroethylene distillation step, is condensed and preferably recycled for admixing with the impure acetylene tetrachloride as described above.

The following examples are presented to define the invention more fully without any intention of being limited thereby. All parts and percentages are by weight unless otherwise specified.

EXAMPLE 1

Acetylene was chlorinated in the presence of ferric chloride catalyst in a commercial chlorinator. The resulting impure acetylene tetrachloride contained 0.153 percent free chlorine. Twelve portions of this impure acetylene tetrachloride were designated as portions A through L respectively. Portion A was stored at a temperature of seventy-five degrees centigrade for about eighteen hours and then analyzed for free chlorine content. A proportion of either trichloroethylene or a low boiling fraction predominating in dichloroethylene which was produced in the distillation of trichloroethylene prepared by the dehydrochlorination of acetylene tetrachloride, was added in small proportions to the remaining eleven portions of the impure acetylene tetrachloride, and then stored at various temperatures for various periods as indicated in the table below. After storage, each portion was analyzed for free chlorine content. As indicated in the table, the trichloroethylene, and in some instances, the low boiling fraction from the trichloroethylene distillation, were dried with a solid desiccant prior to the addition to the impure acetylene tetrachloride.

Table

| Ex. | Portion | Additive | Proportion of additive, percent | Temp., °C. | Aging time, hours | Free chlorine content at end of period, percent |
|---|---|---|---|---|---|---|
| 1 | A | None | None | 75 | 18 | 0.089 |
| 2 | B | Low boiling fraction, dried. | 2 | 27 | 1.75 | 0.051 |
| 3 | C | Low boiling fraction, not dried. | 2 | 27 | 15 | 0.020 |
| 4 | D | Low boiling fraction, dried. | 2 | 75 | 0.25 | Trace |
| 5 | E | Trichloroethylene, dried. | 2 | 75 | 0.25 | None |
| 6 | F | Low boiling fraction, dried. | 2 | 40 | 0.25 | 0.0022 |
| 7 | G | ___do___ | 2 | 40 | 0.50 | None |
| 8 | H | Low boiling fraction, not dried. | 2 | 40 | 0.25 | 0.0022 |
| 9 | I | ___do___ | 2 | 40 | 0.50 | None |
| 10 | J | ___do___ | 1 | 40 | 0.25 | 0.0198 |
| 11 | K | ___do___ | 1 | 40 | 0.50 | 0.0099 |
| 12 | L | ___do___ | 1 | 40 | 0.75 | 0.0044 |

It can be seen from a comparison of Example 1 with Examples 2 to 12 that when a small proportion of unsaturated chlorinated hydrocarbon is added to impure acetylene tetrachloride in accordance with the process of the invention, as set forth in Examples 2 through 12, that a marked reduction of the free chlorine content is readily attained.

EXAMPLE 13

A sample of crude acetylene tetrachloride was obtained from a storage tank containing approximately seventeen thousand gallons of crude liquor representing a composite product from a battery of eleven chlorinators. The temperature of the liquor in the tank was forty degrees centigrade, and the chlorine content was 0.106 percent. To this tank there was added over a period of one hour, approximately one hundred gallons of crude chlorinated ethylenes obtained as a foreshot from the trichloroethylene stills. Circulation and mixing of the tank contents were provided by withdrawing a stream from the tank bottom through a pump and returning the stream to the top of the tank. At the end of one hour a sample of the tank contents showed a chlorine content of 0.0022 percent.

EXAMPLE 14

Fresh chlorinator liquor containing about 0.10 percent free chlorine was supplied to the tank at a rate of about 8.0 gallons a minute over a period of one hunderd and twelve hours. To this stream there was metered continuously an amount of the aforementioned crude chlorinated ethylenes corresponding to about 1.7 percent by volume of the crude acetylene tetrachloride. Throughout this period the tank discharge showed a negligible content of free chlorine, with a maximum content of 0.0025 percent.

It will be apparent to one skilled in the art that various modifications, some of which have been referred to above, may be employed without departing from the spirit of

I claim:

1. The process of reducing the concentration of free chlorine, hydrogen chloride, and iron-containing impurities in impure acetylene tetrachloride, containing between about 0.1 and about 0.4 percent free chlorine, which comprises admixing said impure acetylene tetrachloride with between about 0.1 and about 5.0 percent by weight of an unsaturated chlorinated hydrocarbon selected from the group consisting of trichloroethylene, dichloroethylene, the low boiling fraction produced in the distillation of impure trichloroethylene, and mixtures thereof, whereby said unsaturated chlorinated hydrocarbon reacts with chlorine to yield saturated chlorinated hydrocarbons selected from the group containing acetylene tetrachloride, pentachloroethane, and mixtures thereof, admixing the resulting solution with water whereby hydrogen chloride and iron containing impurities are extracted by the water, and separating the resulting non-aqueous purified acetylene tetrachloride phase from the aqueous phase containing dissolved impurities.

2. The process of claim 1 wherein the proportion of said chlorinated hydrocarbon is between about 0.5 and about 2.0 percent by weight of said impure acetylene tetrachloride, and wherein the ratio of water to acetylene tetrachloride is between about 1:3 and about 1:5.

3. The process of claim 1 wherein said chlorinated hydrocarbon is trichloroethylene.

4. The process of claim 1 wherein said chlorinated hydrocarbon is dichloroethylene.

5. The process of claim 1 wherein said chlorinated hydrocarbon is the low boiling fraction containing dichloroethylene produced in the distillation of impure trichloroethylene.

6. In the process of preparing trichloroethylene by chlorinating acetylene in the presence of ferric chloride to produce acetylene tetrachloride containing between about 0.1 and about 0.4 percent free chlorine, and dehydrochlorinating the resulting acetylene tetrachloride to yield trichloroethylene, the improvement which comprises reducing the concentration of free chlorine in the impure acetylene tetrachloride by admixing the resulting acetylene tetrachloride prior to dehydrochlorination, with between about 0.1 and about 5.0 percent by weight of unsaturated chlorinated hydrocarbon, selected from the group consisting of trichloroethylene, dichloroethylene, the low boiling fraction containing dichloroethylene produced by the distillation of impure trichloroethylene, and mixtures thereof.

7. The process of claim 6 wherein said unsaturated chlorinated hydrocarbon is trichloroethylene.

8. The process of claim 6 wherein said unsaturated chlorinated hydrocarbon is dichloroethylene.

9. The process of claim 6 wherein said unsaturated chlorinated hydrocarbon is the low boiling fraction containing dichloroethylene produced in the distillation of impure trichloroethylene.

10. In the process of preparing trichloroethylene by chlorinating acetylene in the presence of ferric chloride to produce acetylene tetrachloride containing between about 0.1 and about 0.4 percent free chlorine, and thermally dehydrochlorinating the resulting acetylene tetrachloride to yield trichloroethylene and hydrogen chloride, the improvement which comprises reducing the concentration of free chlorine in the impure acetylene tetrachloride by admixing the resulting acetylene tetrachloride prior to thermal dehydrochlorination, with between about 0.1 and about 5.0 percent by weight of an unsaturated chlorinated hydrocarbon, selected from the group consisting of trichloroethylene, dichloroethylene, the low boiling fraction containing dichloroethylene produced by the distillation of impure trichloroethylene, and mixtures thereof, and admixing the resulting solution with water to yield a dispersion of water in said acetylene tetrachloride, allowing the resulting dispersion to settle into an aqueous phase and an organic phase, and separating purified acetylene tetrachloride as the organic phase from the aqueous phase.

11. The process of claim 10 wherein the proportion of said water is equivalent to a weight ratio of water to said acetylene tetrachloride of between about 1:3 and about 1:5.

12. The process of claim 10 wherein said unsaturated chlorinated hydrocarbon is trichloroethylene.

13. The process of claim 10 wherein said unsaturated chlorinated hydrocarbon is dichloroethylene.

14. The process of claim 10 wherein said unsaturated chlorinated hydrocarbon is the low boiling fraction containing dichloroethylene produced by the distillation of impure trichloroethylene.

15. The process for preparing trichloroethylene and hydrogen chloride which comprises chlorinating acetylene in the presence of a ferric chloride catalyst to yield an impure acetylene tetrachloride material containing between about 0.1 and about 0.4 percent free chlorine, hydrogen chloride and iron-containing impurities, admixing said impure acetylene tetrachloride with between about 0.1 and about 5.0 percent by weight of an unsaturated chlorinated hydrocarbon selected from the group consisting of trichloroethylene, dichloroethylene, the low boiling fraction containing dichloroethylene produced by the distillation of impure trichloroethylene, and mixtures thereof, whereby free chlorine reacts with said unsaturated chlorinated hydrocarbon to yield saturated chlorinated hydrocarbons, admixing the resulting organic material with water to yield an aqueous dispersion of water in said organic solution, allowing the resulting dispersion to settle into an aqueous phase and a non-aqueous phase, separating the non-aqueous phase of acetylene tetrachloride substantially free of inorganic impurities, subjecting the purified acetylene tetrachloride to thermal dehydrochlorination to yield a gaseous mixture of trichloroethylene and hydrogen chloride, cooling the gaseous mixture to condense a liquid phase comprising impure trichloroethylene containing dichloroethylene impurities, recovering gaseous hydrogen chloride as the uncondensed gas, distilling the liquid impure trichloroethylene, recovering the low boiling fraction containing dichloroethylene which boils below a temperature equivalent to about 85 degrees centigrade at atmospheric pressure, condensing said low boiling fraction, recycling said condensed low boiling fraction for admixing with the impure acetylene tetrachloride, and recovering substantially pure trichloroethylene from said distillation step.

References Cited in the file of this patent

UNITED STATES PATENTS 2,894,045    Carley et al.    July 7, 1959
2,907,797    Petering et al.    Oct. 6, 1959